March 17, 1964   D. A. McCUNE   3,125,678
FAST NEUTRON DOSIMETER FOR HIGH TEMPERATURE OPERATION
BY MEASUREMENT OF THE AMOUNT OF CESIUM 137 FORMED
FROM A THORIUM WIRE
Filed Sept. 7, 1962

INVENTOR.
Donald A. Mc Cune
BY
_ATTORNEY._

United States Patent Office 3,125,678
Patented Mar. 17, 1964

3,125,678
FAST NEUTRON DOSIMETER FOR HIGH TEMPERATURE OPERATION BY MEASUREMENT OF THE AMOUNT OF CESIUM 137 FORMED FROM A THORIUM WIRE
Donald A. McCune, Scotia, N.Y., assignor to the United States of America as represented by the United States Atomic Energy Commission
Filed Sept. 7, 1962, Ser. No. 222,243
3 Claims. (Cl. 250—83.1)

This invention relates to a method and device for the measurement of neutron flux and more particularly, for the measurement of integrated fast neutron flux in the presence of a large thermal neutron field.

In order to determine the effect of neutron irradiation upon various substances, it is necessary to subject a sample of the substance in question to a radiation field, remove it therefrom, and through analysis of the specimen determine to what extent it has been affected by the radiation to which it has been exposed. Such a process is commonly known as an irradiation surveillance program. Irradiation surveillance systems are utilized to obtain data, under nuclear reactor operating conditions, for predicting the effect of neutron irradiation on the fatigue strength of metals, usually metals planned for use in future reactors. Sample bars and fatigue test specimens are irradiated in the system for various exposure levels and tested. The fatigue test specimens may, for example, be inserted through the pressure vessel head of a reactor, into tubes in the thermal shield. In many instances it is desirable to know to what extent the sample has been bombarded with fast neutrons, excluding bombardment by slow, or thermal, neutrons.

Exposures to radiation flux are determined by dosimeters. The present method of obtaining a measurement of long term, integrated, fast neutron flux requires the irradiation and analysis of dosimeters at intermittent time intervals. The dosimeter is placed in proximity to the sample being irradiated, each measurement providing an indication of instantaneous flux. These short term intermittent measurements are mathematically integrated to calculate the long term integrated fast neutron flux. Taking a large number of such measurements and mathematically integrating them is time consuming.

An object of this invention is to provide a method of measuring integrated fast neutron flux in the presence of a large thermal neutron flux, wherein only one measurement need be taken.

A further object of this invention is to provide an instrument capable of measuring integrated fast neutron flux in the presence of a large thermal neutron flux.

A still further object is to provide such an instrument resistant to high temperature, of long life expectancy, and capable of being manufactured in small sizes.

These objects are accomplished by the present invention which is a high-temperature, long life, fast neutron dosimeter, susceptible to miniaturization. The operation of the device is founded upon the fast neutron bombardment of thorium, which causes the formation of cesium in a quantity proportional to the integrated fast neutron flux.

Figure 1:
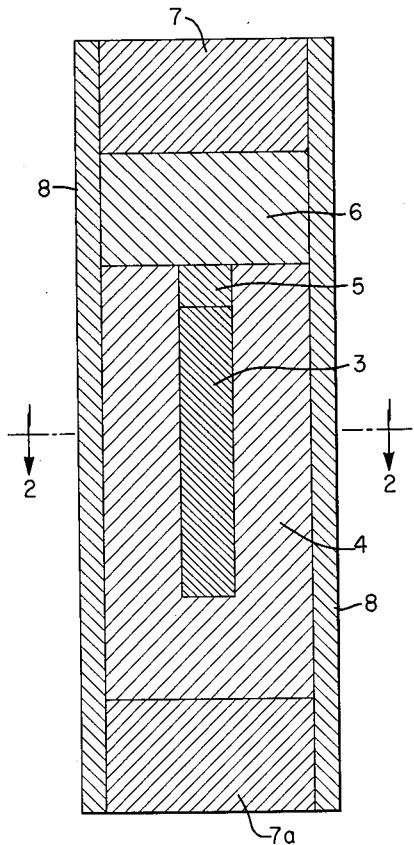
FIGURE 1 is a cross sectional elevation view.
Figure 2:
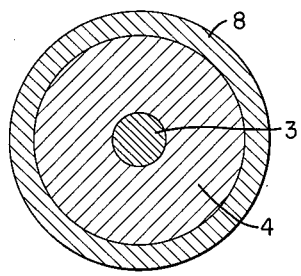
FIGURE 2 is a cross sectional view taken along line 2—2 of FIGURE 1.

Referring to the drawings, the dosimeter includes a thorium wire 3. The thorium wire 3 is surrounded by a cylindrical thermal neutron attenuator shield 4. Placed within thermal neutron shield 4, axially aligned with thorium wire 3, is a spacer wire 5 of heat resistant metal. The length of spacer wire 5 is to be determined at assembly to limit axial clearance of parts 3 and 5 in the axial bore of part 4. Spacer plug 6 is composed of the same thermal neutron attenuator as is shield 4. End plugs 7 and 7a are of heat resistant metal. A seal welded heat resistant sheathing 8 is used to contain the assembly. The sheathing 8 offers mechanical protection to the assembly.

The principle of the measurement device is based upon the fast fission cross section of thorium to neutrons of energy greater than 1.1 mev. No reaction occurs with neutrons below this threshold energy. An atom of thorium bombarded by a neutron of an energy greater than the threshold energy of 1.1 mev. fissions. Cesium is a fission product of thorium, formed in statistically fixed proportions. The cesium is recovered and measured by using radio-chemical purification and radioactive counting. (See United States Atomic Energy Commission publication NYO-7877 (Rev. 1), "Summary of Neutron Measurement Methods.") The amount of cesium formed is proportional to the thorium fissioned which is proportional to the integrated fast neutron flux.

The function of the thermal neutron attenuator shield is to prevent slow neutron activation of thorium which by activation and decay would produce uranium-233, which fissions at a much lower neutron energy than thorium. Uranium-233 also fissions to produce cesium and so would interfere with the analysis which is based upon thorium-produced cesium.

The thermal neutron attenuator, 4 and 6, must in addition to its thermal neutron attenuation properties, have a relatively high melting point. As an example, a cadmium-silver alloy has been found acceptable. In this alloy, the element cadmium serves as a thermal neutron shield; silver is added to raise the melting point so as to permit its use in a power type nuclear reactor. One alloy presently in use comprises 79 weight percent cadmium and 21 weight percent silver. The silver is sufficient to raise the melting point of the alloy to 721° F., a temperature sufficient to permit use in a particular power reactor. The cadmium-silver alloy is brittle and requires special techniques for fabrication, such as vacuum casting and centerless grinding. Other thermal neutron attenuators, such as alloys of boron and hafnium, may be substituted provided melting temperature is at least equal to that of the cadmium-silver alloy.

The material of sheathing 8 must offer mechanical protection and have good heat resistant qualities, such as, for example, stainless steel or zirconium. Other metals of like characteristics could be utilized.

Other variations of this device include changes in the amount of thorium, amount of thermal neutron attenuator, and if the cadmium-silver alloy is used the percent cadmium content, affecting measuring sensitivity, allowable thermal neutron intensity and temperature limitations respectively. The thorium wire length may be increased so as to obviate the necessity of the spacer wire. Of course, prospective use will dictate size considerations.

This device is presently in use in testing materials subjected to fast neutron bombardment. In its present use, where small size is important, a one inch long model is utilized. In order to obtain such a device the following suggested dimensions are observed: wire 3 length varied, approximately .557 inch., diameter .012–.015 in. Thermal attenuator 4 lengths—.646–.666 in., diameter .070–.071 in. Spacer wire 5 length—preferably so as to limit axial clearance of parts 3 and 5 to—.000–.010 in., diameter .012–.015 in. Spacer plug 6 length—0.86–.102 in., diameter .070–.071. End plug 7 and 7a length—.124–.126 in. and .070–.071 in. diameters. While all dimensions are merely suggested, parts 4, 6, 7, and 7a must be of approximately equal diameters. Sheathing 8, its length depending on lengths of other pieces cumulatively, may be .98–1.02 in., inside diameter of the sheathing .073–.075 in., and the outside diameter of the entire assembly .089–.091 in.

Observance of the above dimensions will provide a dosimeter of approximately one inch in length and capable of high temperature operation. Further, with this particular adaptation, measurements of integrated fast neutron flux may be made with up to $1.5 \times 10^{20}$ $nvt$ thermal neutron flux background. Still further, measurements may be made over a long period of time, for example, up to 10–15 years. Since cesium 137 has a half-life of 37 years, radioactive decay during the measurement period is negligible for most tests, and where measurement times approach 10–15 years, the decay of cesium produced earlier in the irradiation may be corrected for, depending upon the accuracy required.

The advantage of this device over the previous procedure of taking numerous instantaneous measurements and integrating them mathematically is obvious.

While the salient features of the present invention have been described in detail with respect to one embodiment, it will, of course, be apparent that numerous modifications may be made within the scope and spirit of the invention and it is, therefore, not desired to limit the invention to the exact details shown except insofar as they may be defined in the following claims.

What is claimed is:

1. A fast neutron dosimeter comprising a thermal neutron attenuator cylinder having an axial bore extending a portion of the length of said cylinder, a thorium wire disposed in said bore, a thermal neutron attenuator spacer plug disposed at the bored end of said cylinder, a heat resistant plug disposed adjacent to said spacer plug, a second heat resistant plug disposed adjacent to unbored end of said cylinder, and a cylindrical heat resistant sheathing disposed about said cylinder and said plugs.

2. The device of claim 1 wherein said thermal neutron attenuator cylinder and said thermal neutron attenuator spacer plug comprise a cadmium-silver alloy, and said heat resistant plug and said second heat resistant plug and said heat resistant sheathing comprise stainless steel.

3. A method of determining integrated fast neutron flux in the presence of a large thermal neutron field comprising the steps of inserting a thorium wire encased in a thermal neutron attenuator shield surrounded by a heat resistant sheathing into a fast neutron flux whereby a quantity of cesium-137 is formed proportional to the integrated fast neutron flux, removing the device from said flux after a predetermined time, removing the thorium wire from the thermal neutron attenuator shield, separating the cesium thus formed from the other fission products and from the thorium by radio-chemical processing, and counting the radio activity of the separated cesium to determine the amount of cesium-137 formed.

References Cited in the file of this patent

UNITED STATES PATENTS

| | | |
|---|---|---|
| 2,743,226 | Newson | Apr. 24, 1956 |
| 2,852,460 | Abbott | Sept. 16, 1958 |
| 2,863,062 | Sturm | Dec. 2, 1958 |
| 2,872,402 | Ura | Feb. 3, 1959 |
| 2,969,307 | Fermi | Jan. 24, 1961 |